April 25, 1967

R. B. HARVEY ETAL 3,315,763

AUTOMOTIVE VEHICLE LIFT

Filed May 18, 1964

April 25, 1967 R. B. HARVEY ETAL 3,315,763
AUTOMOTIVE VEHICLE LIFT
Filed May 18, 1964 4 Sheets-Sheet 3

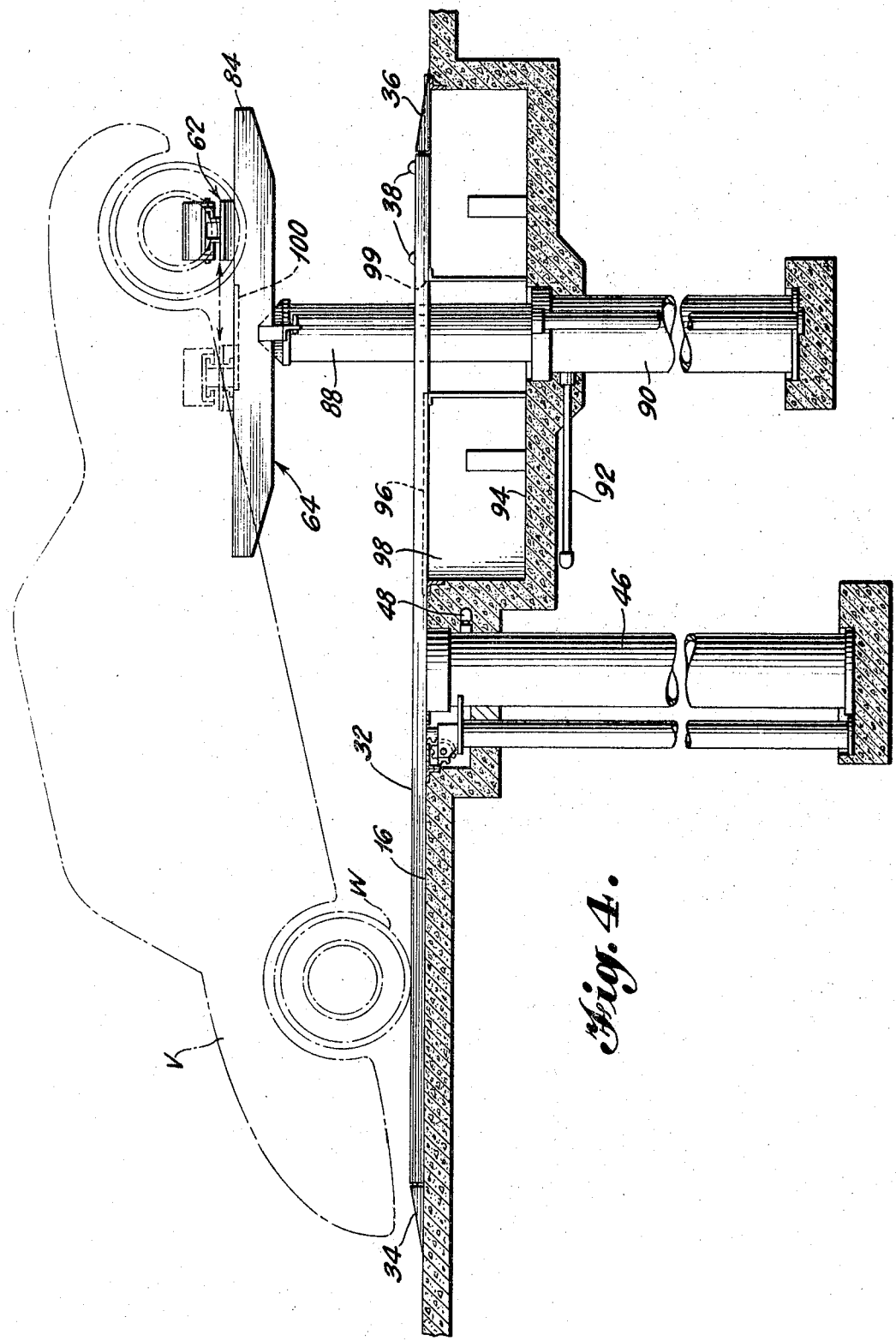

United States Patent Office 3,315,763
Patented Apr. 25, 1967

3,315,763
AUTOMOTIVE VEHICLE LIFT
Robert B. Harvey, Rosemont, Pa., and Charles H. Pancoast, Pitman, N.J., assignors to Mobil Oil Corporation, a corporation of New York
Filed May 18, 1964, Ser. No. 368,228
9 Claims. (Cl. 187—8.54)

This invention relates to automotive vehicle lifts and more particularly, it concerns vehicle lifts having special utility in automotive vehicle servicing installations of the type disclosed in a copending application of George B. Myrtetus and Charles H. Pancoast, Ser. No. 276,702, filed Apr. 30, 1963, and entitled, "Automotive Vehicle Servicing."

Automotive vehicle servicing installations of the type disclosed in the aforesaid copending application employ a "diagnostic bay" through which a vehicle to be serviced is passed rapidly and in a highly efficient manner to locate or diagnose faulty conditions existing in the vehicle and requiring repair. In diagnostic bays of this type, numerous pieces of testing equipment including a dynamometer, wheel unbalance detection means, wheel alignment measuring apparatus, exhaust gas analyzing equipment, and others have been employed. However, no provision has been made by which a complete inspection of the underside of the vehicle may be made during the diagnostic procedure nor has provision been made to facilitate an efficient inspection of the front wheel suspension and steering components of the vehicle. As a result, certain shortcomings have been experienced in the use of the diagnostic bay. For example, where the front end suspension of the vehicle had not been checked for looseness of such items as ball joints or the like the reading registered on the wheel alignment apparatus often erroneously reflected a problem more directly associated with a defect in the front suspension rather than one truly associated with wheel alignment. Also, other minor defects in the automobile such as leaky oil seals often went undetected.

In accordance with the present invention, these shortcomings are substantially alleviated by the provision of an automotive vehicle lift adapted to be positioned in a diagnostic bay of the type referred to and by which a more complete initial inspection of the entire vehicle prior to the performance of more refined automated tests is facilitated. To accomplish this result among others, the lift of the present invention embodies a pair of lifting components; one for lifting the vehicle by engagement with the wheels thereof and the other for engaging the vehicle body structure. In this manner, the entire vehicle may be elevated with the wheels supported on the first of the lifting components for a complete inspection of the underside of the vehicle whereas the other of the lifting components may be employed to elevate the vehicle to facilitate removal of the front wheels, for example, both lifting components being arranged to be operative without movement of the vehicle. It is preferred that the lifting component engageable with the wheels of the vehicle be in the form of a pair of spaced wheel tracks, each of the tracks being associated with a separate lifting post so that virtually the entire underside of the vehicle is open to inspection without interference by the lifting mechanism. Also, the body engaging lifting component is preferably arranged to be carried by the spaced tracks so that while the vehicle is in an elevated position, the body engaging portion of the other lifting components may be adjusted to engage the desired components of the vehicle body frame or suspension system.

It is, therefore, a principal object of the present invention to provide an automotive vehicle lift particularly suited for use in a diagnostic bay in such a manner as to enhance the character of diagnosis made in the bay without involving a substantial increase in the time required for the diagnosis.

Another object of this invention is to provide an automotive vehicle lift by which substantially the entire underside of a vehicle would be exposed to view when the vehicle is elevated without obstruction by the lifting mechanism.

A further object of this invention is to provide an automotive vehicle lift of the type referred to which may be used to elevate an automotive vehicle by supporting it on its wheels or on its body frame structure without requiring movement of the vehicle.

Another object of this invention is to provide an automotive vehicle lift of the type referred to with vehicle wheel supporting tracks and with an adjustable body engaging support carried on the tracks in a manner so that the body engaging support may be adjusted to conform to the arrangement of the specific body or frame structure of the vehicle while the entire vehicle is in an elevated position and supported on said tracks.

Other objects and further scope of applicability of the present invention will become apparent from the detailed description given below taken in conjunction with the accompanying drawings in which:

FIG. 4 is a side elevation similar to FIG. 3 but showing another operative position of the lift;

Figure 1:
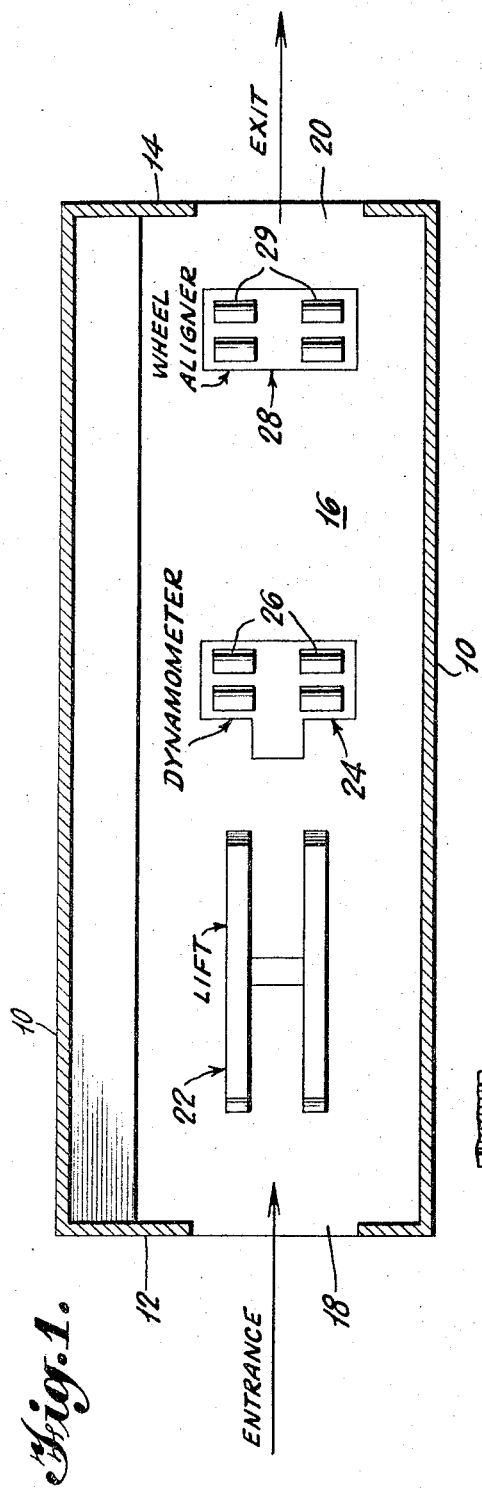
FIG. 1 is a schematic view of the floor plan of a diagnostic bay of the type to which the automotive vehicle lift of this invention is particularly adapted.
Figure 5:
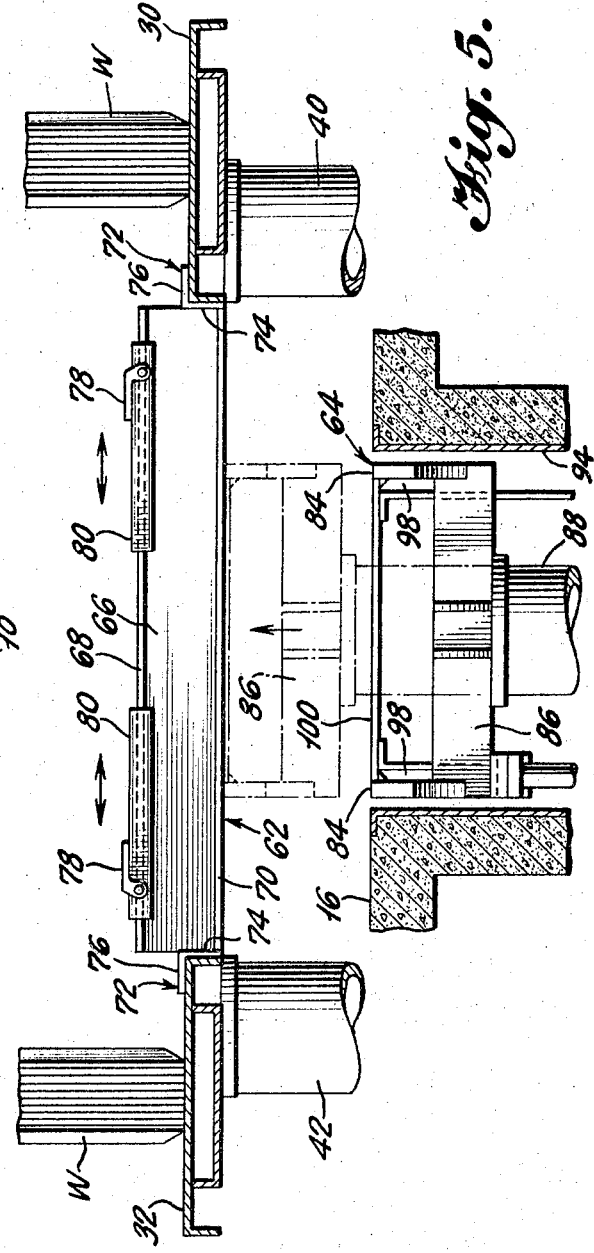
FIG. 5 is an enlarged fragmentary cross section taken on line 5—5 of FIG. 3.
Figure 2:
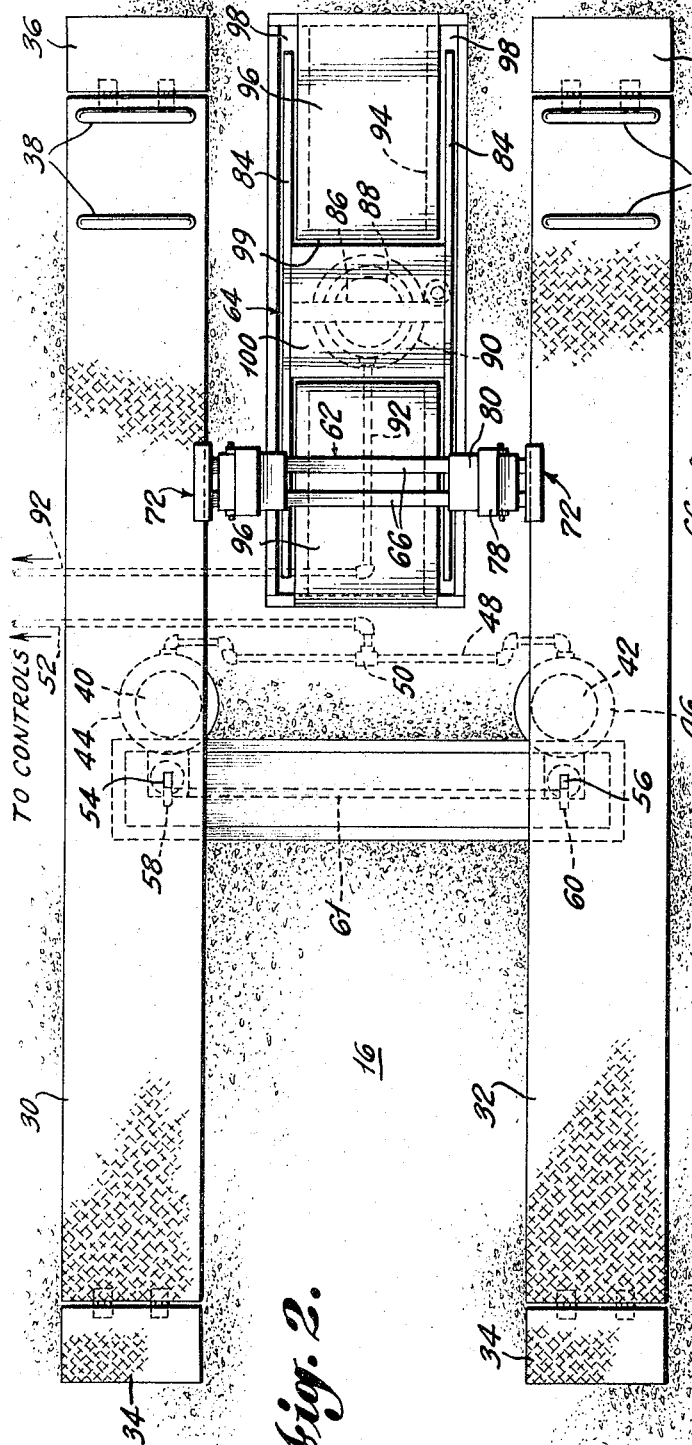
FIG. 2 is an enlarged plan view of the automotive vehicle lift of this invention.
Figure 6:
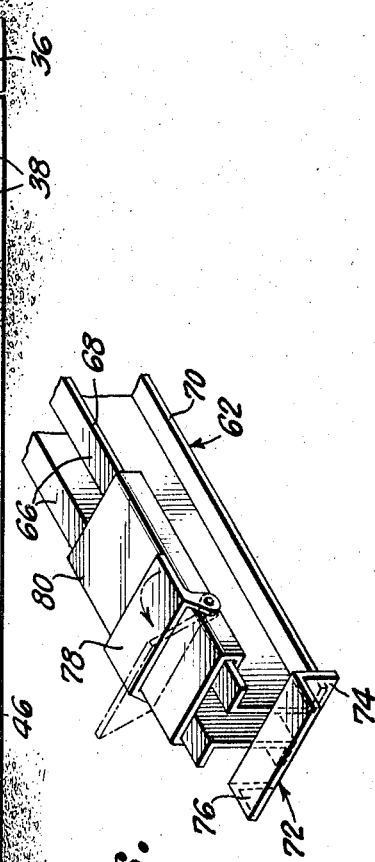
FIG. 6 is a fragmentary perspective view illustrating the adjustable body engaging component of the lift of this invention.
Figure 3:
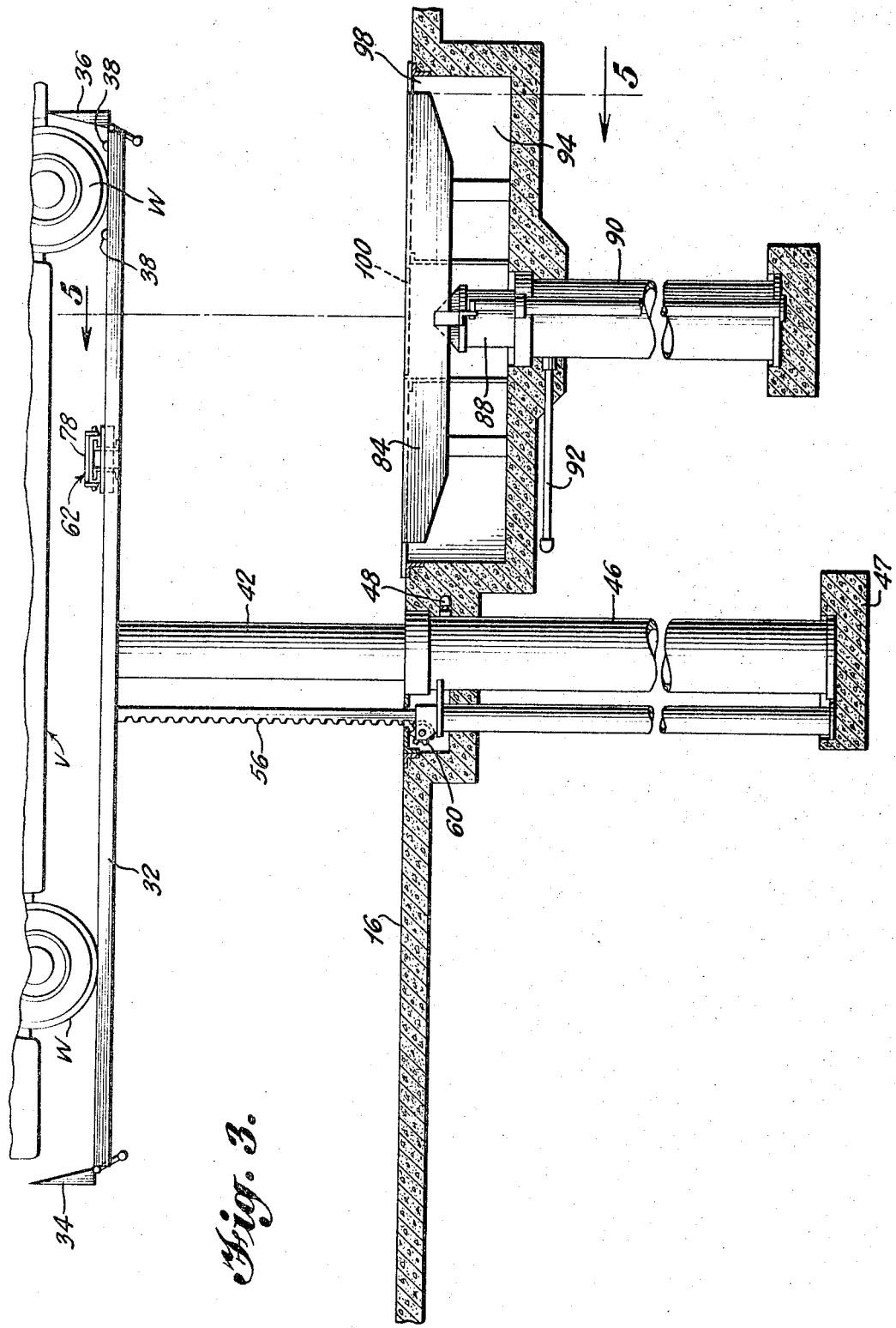
FIG. 3 is a side elevation of a lift illustrated in FIG. 2 in one operative position thereof.

Referring now to the drawings and particularly to FIG. 1 thereof, a diagnostic bay with which the vehicle lift of the present invention is especially suited for use is shown as an enclosure defined by sidewalls 10, end walls 12 and 14, and a floor 16. An entrance 18 is provided in the end wall 12 and correspondingly, an exit opening 20 is provided in the end wall 14. As described in the abovementioned copending application, Ser. No. 276,702, filed Apr. 30, 1963, the diagnostic bay is equipped with numerous items of highly refined testing equipment located at spaced work stations, at which a vehicle to be tested is positioned successively during the diagnostic procedure. For purposes of gaining a full understanding of the present invention, however, it will suffice to note that the diagnostic bay includes the lift of the present invention generally designated by the reference numeral 22 situated toward the entrance 18 to establish a first work station, a dynamometer 24 having rollers 26 for receiving successively the front and rear wheels W of a test vehicle V, thereby defining second and third work stations and a wheel aligner 28 having rollers 29 establishing a fourth work station on which the front wheels of the vehicle are cradled during the performance of wheel alignment test procedure. The diagnostic bay is operated in an extremely efficient and systematic manner so that a vehicle V to be tested may be brought through the entrance 18 and out of the exit 20 in as short a time as possible using a minimum of personnel and yet providing a complete diagnosis of all conditions needing correction in the vehicle. It is in this environment that the automotive vehicle lift 22 of the present invention is particularly suited for use in the sense that the time required to elevate the entire vehicle, to facilitate a complete and rapid inspection of its underside, together with elevation of its front end to permit removal of the front wheels is kept at absolute minimum.

Hence, as shown in FIGS. 2-6, the lift 22 includes a pair of spaced wheel supporting tracks 30 and 32, each of which is conventional to the extent that it includes a hinged approach ramp 34 on one end, a runoff ramp 36 at the opposite end and wheel spotting bars 38. In accordance with the present invention, however, each of the tracks 30 and 32 is connected to the upper end of and adapted to be elevated by a separate plunger or lifting post 40 and 42, respectively. The plungers in turn are telescopically positioned within cylinders 44 and 46 respectively supported on a suitable foundation 47 in a well below the level of the floor 16. A source of hydraulic fluid is connected to the cylinders 44 and 46 for simultaneous actuation by way of a pipe 48 communicating directly with each of the cylinders and having a T-connection 50 to which a line 52 is connected at one end and at the other end to suitable controls (not shown). Because of the control arrangement thus employed for feeding hydraulic fluid to the cylinders and to elevate the respective plungers 40 and 42 connected to the tracks 30 and 32, the tracks will be elevated substantially at the same rate by manipulation of the proper control element. To assure this mode of operation, however, the tracks 30 and 32 are mechanically interconnected by racks 54 and 56 connected at their upper end to the tracks and adapted to be engaged by pinions 58 and 60, respectively, nonrotatably secured at opposite ends of a rod or axle 61 positioned below the level of the floor 16. Thus, it will be seen that both of the tracks 30 and 32 may be elevated at the same rate to assure both being at the same level at all times, and yet, the space below a vehicle positioned on the tracks is substantially unobstructed by any of the lifting components.

In addition to the wheel supporting tracks 30 and 32 and related lifting components described above, the vehicle lift of the present invention is provided with an auxiliary front end lift, which in the form shown is positioned between the tracks 30 and 32 and generally includes an adjustable body engaging assembly or superstructure 62 together with a lifting assembly generally designated by the reference numeral 64. The term "body engaging" as used herein and in the appended claims to designate the assembly 62 or parts thereof is intended to delineate engagement with those portions of a vehicle other than the wheels. In this context therefore, the word "body" encompases the vehicle body structure, frame, suspension system or any other portion of the vehicle which, if engaged and lifted, would remove the weight of the vehicle from the wheels to faciliate their removal. As most clearly shown in FIG. 6 of the drawings, the body engaging assembly 62 includes a beam defined by a pair of transverse channels 66 each having upper and lower flanges 68 and 70. The channels 66 are retained in generally parallel spaced relationship by end brackets 72 of L-shaped cross section suitably secured to the ends of the channels by welding or otherwise fixing a vertical flange 74 to the channel end faces thus leaving the other leg or flange 76 thereof extending as a mount by which the channels may be slidably supported on the tracks 30 and 32. Because of this slidable mount feature, it will be appreciated that the channels 66 and thus the body engaging assembly may be adjustably positioned longitudinally of a vehicle situated on the tracks 30 and 32. To facilitate adjustability transversely of the vehicle, a pair of body engaging chocks 78 are secured to carriages 80 of C-shaped cross-sectional configuration to enable slidable engagement with the upper flanges 68 of the channels 66. Thus, it will be apparent that the chocks 78 are universally adjustable in a horizontal plane to facilitate alignment with a component of the vehicle body intended to be engaged by virtue of the slidable adjustment of the carriages 80 transversely on the channels 66 and the longitudinal adjustment of the channels on the tracks 30 and 32. Also, it is preferred that the chocks 78 be hinged to the ends of the carriages as shown most clearly in FIG. 6. In this manner the chocks may be used in the position shown in solid lines, or in an upright position, as shown in dashed lines, depending on the vehicle sub-structure to be engaged.

The lifting assembly 64 of the auxiliary lift includes platform means in the form of a pair of longitudinally disposed rails 84 connected in spaced relation by a transverse beam 86. The beam 86, and thus the platform established by the rails 84 is connected to the upper end of a plunger or lifting post 88 telescopically positioned within a hydraulic cylinder 90. The cylinder 90 is supplied with hydraulic fluid by way of a pipe 92 connected to a suitable control (not shown). The entire lifting assembly 64, when in its lowermost or retracted position is contained within a well 94 in the floor 16 of the diagnostic bay so that the upper surfaces of the rails 84 are flush with the floor 16. Moreover, it will be noted that the major portion of the well 94 is covered by a pair of floor plates 96 shaped to leave slots 98 through which the rails 84 may be elevated and an opening 99 for the ram 88 and the beam 86. Further, a plate 100 supported by the rails 84 is disposed over the ram 88 and beam 86 to fill the opening 99. The plate 100 is flush with the tops of rails 84 to provide a continuous substantially unobstructed floor under a vehicle supported on the tracks 30 when the lifting component 64 is in its retracted position.

In operation, the vehicle V to be tested in the diagnostic bay is driven through the entrance 18 and positioned on the lift 22 such that the wheels W thereof are on the tracks 30 and 32. An attendant or "diagnostician" in the bay then manipulates the controls to energize the lifting cylinders 44 and 46 to raise the car to a suitable working height. At this time in the diagnostic procedure, the tire pressure is inspected and adjusted; and the underside of the car's front end is inspected for loose tie rods, idler arms, oil and coolant leaks, as well as for other defects capable of being observed while the car is elevated above the floor. Also at this time, the body engaging assembly 62 of the auxiliary front end lift is adjusted so that the chocks 78 are positioned directly beneath components of the vehicle body capable of supporting the weight of the vehicle. Thereafter, the lifting cylinders 44 and 46 are de-energized to lower the tracks 30 and 32 again onto the floor 16 of the bay. As soon as the tracks 30 and 32 have engaged the floor 16, the auxiliary front end lift cylinder 90 is actuated to elevate the rails 84 upwardly into engagement with the lower flanges of the channel 66 and then to lift the body engaging assembly upwardly until the chocks 78 contact the desired components of the vehicle undercarriage. The front end of the vehicle is then lifted by further upward movement of the ram 88 until the position illustrated in FIG. 4 is achieved. In this position, the front wheels of the vehicle will be supported freely. Hence, a diagnostician in the bay may proceed to remove the front wheels to facilitate a complete inspection of the front wheel bearings, brake components and other related items. Also, and after the wheel has been replaced, the wheels are very simply checked for ball joint or kingpin looseness. If such looseness is found to exist, this information is recorded and subsequent diagnostic procedures altered accordingly. Specifically, after the vehicle is passed over the dynamometer 24 and appropriate tests made, if no looseness is in fact found in the kingpins or in the front end generally, the wheel alignment tests may be made on the wheel aligner 28. If, for example, loose ball joints are detected on the lift, then the wheel alignment test function need not be performed since the results thereof would reflect the looseness detected in the front end of the vehicle. Accordingly, often much valuable time is saved in this manner.

Thus it will be seen that the present invention affords an extremely effective automotive vehicle lift by which the above-mentioned objectives are completely fulfilled. While it has particular utility in combination with a diagnostic bay of the type described above, it will become apparent that other applications for the lift of this invention might be found. For example, the enhanced measure of both speed and safety features by the arrangement of the auxiliary front end lift of this invention renders the automotive lift extremely effective as a maintenance tool by itself. Moreover, the arrangement of spaced lifting posts under the tracks 30 and 32 facilitates an extremely effective arrangement from the standpoint of leaving an unobstructed floor space under the complete vehicle. Since many modifications and adaptations of the present invention are therefore possible, it is to be distinctly understood that the foregoing description is illustrative of a preferred embodiment only, not limiting, and that the true spirit and scope of the present invention is to be determined by the appended claims.

The invention claimed is:
1. A lift for an automotive vehicle having a body suspended on wheels, said lift comprising: a pair of spaced wheel supporting tracks; first elevating means for lifting said tracks vertically to an elevated position; and auxiliary lifting means engageable with the vehicle body, said auxiliary lifting means including a body engaging assembly resting on said tracks for vertical movement therewith and being movable horizontally relative to said tracks for horizontal registration with the body of the vehicle supported on said tracks, and second elevating means positioned between said tracks, said second elevating means including platform means vertically movable to a position above said tracks to lift said assembly upwardly off of said tracks into lifting engagement with the vehicle body, said first elevating means and said second elevating means being separate from and movable independently of each other.

2. The apparatus recited in claim 1 wherein said body engaging assembly includes means defining a beam extending transversely of said tracks, and means on each end of said beam for slidably engaging said tracks whereby said beam may be adjustably positioned along the length of said tracks.

3. The apparatus recited in claim 2 including a pair of body engaging chocks slidably supported on said beam for adjustable movement transversely of said tracks.

4. The apparatus recited in claim 2 wherein said platform means includes a pair of rails for engagement with the underside of said beam, said rails extending in generally parallel relationship to said tracks.

5. A lifting apparatus for elevating a vehicle having a body suspended on wheels from a floor, said apparatus comprising: a pair of spaced tracks for receiving the vehicle wheels, said tracks being movable between an initial position resting on the floor and an elevated position, first and second lifting posts positioned under each of said tracks respectively for moving said tracks simultaneously between said initial and said elevated position, and a front end lift positioned between said tracks, said front end lift including a body engaging assembly adapted to rest slidably on said spaced tracks for horizontal positioning with respect to the vehicle body, a third lifting post and platform means supported at the upper end of said third lifting post for movement between a lower position flush with the floor and an upper position, said first and second lifting posts being movable independently of said third lifting post, said body engaging assembly being supported by said platform means when said tracks are in said initial position and said platform means is in said upper position.

6. The apparatus recited in claim 5 including a rack depending from each of said tracks adjacent said first and second lifting posts respectively, pinions meshing with each of said racks and an axle fixedly mounting said pinions, said axle and said pinions being positioned under said floor.

7. The apparatus recited in claim 6 in which said body engaging assembly includes a beam extending transversely between said tracks and pair of chocks slidably mounted on the upper side of said beam.

8. In an automotive servicing installation, the combination comprising: means including a floor defining a diagnostic bay through which a vehicle having a body suspended on wheels is passed for diagnosis of substantially all conditions requiring correction, means in said diagnostic bay to establish spaced work stations at which the vehicle is positioned successively for the diagnosis of certain of said conditions, and a vehicle lift positioned at one of said work stations in said diagnostic bay to facilitate an inspection of the vehicle underside, said lift comprising a pair of spaced wheel supporting tracks, first elevating means for lifting said tracks vertically to an elevated position with respect to said floor, and auxiliary lifting means engageable with the vehicle body, said auxiliary lifting means including a body engaging assembly resting on said tracks for vertical movement therewith and being movable horizontally relative to said tracks for horizontal registration with the body of the vehicle supported on said tracks, and second elevating means positioned between said tracks, said second elevating means including platform means vertically movable to a position above said tracks to lift said assembly upwardly off of said tracks into lifting engagement with the vehicle body, said first elevating means and said second elevating means being separate from and movable independently of each other.

9. The combination recited in claim 8 wherein said platform means includes a pair of rails extending generally parallel with respect to said tracks, said floor having a well for receiving said rails at a level to be flush with the floor when said rails are in their lowermost position.

References Cited by the Examiner

UNITED STATES PATENTS

| | | |
|---|---|---|
| 877,709 | 1/1908 | Gearing. |
| 2,070,960 | 2/1937 | Phillips _____ 187—8.41 |
| 2,095,051 | 10/1937 | Bristol. |
| 2,464,731 | 3/1949 | Thompson _____ 187—8.61 |
| 2,592,845 | 4/1952 | Aron _____ 187—8.52 |
| 2,593,630 | 4/1952 | Thompson _____ 187—8.41 |
| 2,612,355 | 9/1952 | Thompson. |

FOREIGN PATENTS 626,497 2/1936 Germany.

OTHER REFERENCES

Chilton's Motor Age, August 1960, pages 47 and 106.

EVON C. BLUNK, *Primary Examiner.*

SAMUEL F. COLEMAN, *Examiner.*

H. C. HORNSBY, *Assistant Examiner.*